(12) United States Patent
Pai et al.

(10) Patent No.: US 11,881,962 B2
(45) Date of Patent: Jan. 23, 2024

(54) HYBRID MODE MULTICAST ROUTING

(71) Applicant: Cisco Technology, Inc., San Jose, CA (US)

(72) Inventors: Aaditi Ganesh Pai, San Jose, CA (US); Deepika Mulani, Fremont, CA (US); Pooja Indi, San Jose, CA (US); Sasikumar Sadayan, Dublin, CA (US); Trupthi Bharatraj Chougule, San Jose, CA (US); Peter Geoffrey Jones, Gilroy, CA (US); Shawn Wargo, Colorado Springs, CO (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/826,525

(22) Filed: May 27, 2022

(65) Prior Publication Data
US 2023/0388142 A1    Nov. 30, 2023

(51) Int. Cl.
*H04L 12/18* (2006.01)
*H04L 45/52* (2022.01)

(52) U.S. Cl.
CPC ............ *H04L 12/185* (2013.01); *H04L 45/52* (2013.01)

(58) Field of Classification Search
CPC .............................. H04L 12/185; H04L 45/52
See application file for complete search history.

(56) References Cited

U.S. PATENT DOCUMENTS

| | | | |
|---|---|---|---|
| 8,611,346 B1 | 12/2013 | Wijnands et al. | |
| 9,602,294 B1 | 3/2017 | Zhang et al. | |
| 2007/0127473 A1* | 6/2007 | Kessler | H04L 12/185 |
| | | | 370/390 |
| 2009/0067426 A1* | 3/2009 | Ko | H04L 47/125 |
| | | | 370/392 |
| 2011/0211578 A1 | 9/2011 | Zwiebel et al. | |
| 2011/0286450 A1 | 11/2011 | Wijnands | |
| 2012/0327759 A1* | 12/2012 | Han | H04L 47/15 |
| | | | 370/254 |
| 2017/0093589 A1 | 3/2017 | Asthana et al. | |
| 2017/0093612 A1* | 3/2017 | Singh | H05K 999/99 |
| 2021/0243044 A1* | 8/2021 | Chokkanathapuram Sundaram | H04L 12/185 |

* cited by examiner

*Primary Examiner* — Hashim S Bhatti
(74) *Attorney, Agent, or Firm* — Merchant & Gould P.C.

(57) ABSTRACT

Hybrid mode multicast routing may be provided. A switching device may receive a first join. Next, in response to receiving the first join, states for a first protocol mode (e.g., (S, G)) that is source aware and state for a second protocol mode (e.g., (*, G)) that is not source aware may be programed. Then a second join may be sent based on the states associated with the second protocol mode (e.g., (*, G)).

20 Claims, 4 Drawing Sheets

HYBRID MODE MULTICAST ROUTING

TECHNICAL FIELD

The present disclosure relates generally to providing hybrid mode multicast routing.

BACKGROUND

Communication networks are used for transporting information from an information provider to one or more information consumers. One technique for transporting information from an information provider to a group of information consumers over the communication network may be multicasting. Multicasting may allow the information provider, also referred to as a multicast source or sender, to transmit the information as multicast packets simultaneously to one or more information consumers, also referred to as multicast clients or receivers. The multicast packets may be routed from the source to the sender through the communication network by a number of network nodes, also referred to as routers.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
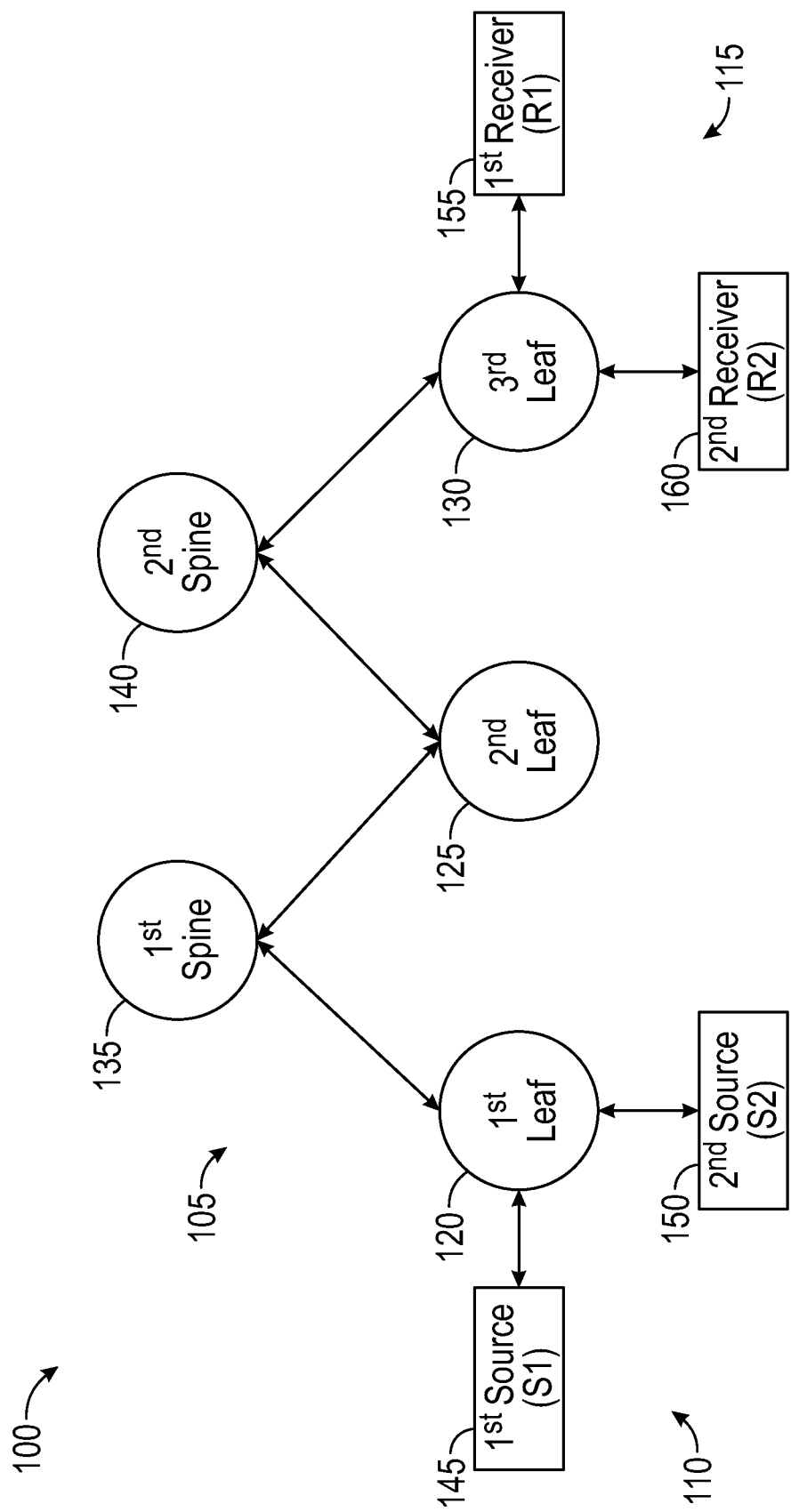
FIG. 1 is a block diagram of an operating environment for providing hybrid mode multicast routing.

Hybrid mode multicast routing may be provided. A switching device may receive a first join. Next, in response to receiving the first join, states for a first protocol mode that is source aware and state for a second protocol mode that is not source aware may be programmed. Then a second join may be sent based on the states associated with the second protocol mode.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Protocol Independent Multicast (PIM) may comprise a family of multicast routing protocols for Internet Protocol (IP) networks that may provide one-to-many and many-to-many distribution of data over a Local Area Network (LAN), a Wide Area Network (WAN), or the Internet for example. It is termed protocol independent because PIM may not include its own topology discovery mechanism, but instead may use routing information supplied by other routing protocols. PIM may not be dependent on a specific unicast routing protocol and may make use of any unicast routing protocol in use on the network. PIM may not build its own routing tables and may use the unicast routing table for Reverse Path Forwarding (RPF).

There may be five variants (i.e., modes) of PIM: i) PIM Sparse Mode (PIM-SM); ii) PIM Dense Mode (PIM-DM); iii) PIM Bidirectional (PIM-Bidir) mode; iv) PIM Source-Specific Multicast (PIM-SSM) mode; and v) PIM Any Source Multicast (PIM-ASM) mode. PIM-SM may build unidirectional shared trees rooted at a Rendezvous Point (RP) per group and may create shortest-path trees per source. PIM-SM may scale well for wide-area usage. PIM-DM may use dense multicast routing. It may build shortest-path trees by flooding a multicast traffic domain wide, and then pruning back branches of the tree where no receivers are present. PIM-DM may have poor scaling properties. PIM-Bidir may build shared bi-directional trees. While it may not build shortest path tree, it may have longer end-to-end delays than PIM-SM. However, PIM-Bidir may scale well because it may need no source-specific state. PIM-SSM may build trees that may be rooted in just one source, offering a more secure and scalable model for a limited number of applications. With PIM-SSM, an IP datagram may be transmitted by a source S to an SSM destination address G, and receivers may receive this datagram by subscribing to channel (S,G). PIM-ASM may comprise an older and more usual form of multicast where multiple senders may be on the same group/channel, as opposed to source-specific multicast where a single particular source may be specified. PIM-ASM may allow a host computer to map IPs and then sends IPs to a number of groups via IP address. This mode of multicasting may allow hosts to transmit to and from groups without any restriction on the location of end user computers by allowing any receiving host group computer to become a transmission source.

With increasing scale numbers, multicast routes created via PIM-ASM mode and PIM-SSM mode in a network may be limited by Ternary Content Addressable Memory (TCAM) space on hardware (i.e., switches). Storing (S, G) and (*, G) entries on all nodes, as may be done in PIM-ASM, may pose a problem when scalability increase occurs. For example, a Last Hop Router (LHR) may receive traffic from multiple sources for a same group (e.g., group G). In this example, (S, G) and (*, G) states may be created on all node from the receiver (e.g., connected to the LHR) all the way to the source though it's only the receiver that may need to know the (S, G) details.

PIM-Bidir mode may be a better alternative to achieve scalability, however it may be limited by the lack of (S, G) based tracking that network users may prefer to have for flow-based trackability and troubleshooting purposes. Furthermore, there may be users who do not wish to move older Internet Group Management Protocol version 2 (IGMPv2) hosts to hosts supporting IGMP version 3 (IGMPv3) and rather configure thousands of SSM translation rules on the LHR to achieve per flow-based tracking. However, this may be cumbersome and error-prone. For example, a user with 30,000 multicast sources (e.g., cameras) sending traffic for two multicast groups, may now have 60,000 (S, G) entries on all nodes, which may require the configuration of 30,000 SSM translation rules on the LHRs. Assuming only Internet Protocol version 4 (IPv4) traffic in this example, if each node has a limited space of 64,000 TCAM entries and there are 64 multicast sources for each of the 900 groups that the receivers may be interested in, with PIM-ASM there may be 57,600 (S, G)+900 (*, G) entries on all routers in a linear topology.

Embodiments of the disclosure may enable a configuration that may be a hybrid of PIM-Bidir and PIM-SM on the LHRs while using PIM-Bidir on all other nodes in the topology. Accordingly, embodiments of the disclosure may provide a hybrid mode on LHRs where both (S, G) and (*, G) states may be maintained. The LHR may use shared tree Reverse-Path Forwarding (RPF) and the (S, G) states may be used for traffic tracking purposes. All other routers in the topology may be in a PIM-Bidir mode maintaining only (*, G) states. Scalability may be greatly improved for the routers in PIM-Bidir mode and a tracking capability (e.g., for troubleshooting) may also be provided.

FIG. 1 shows an operating environment 100 for providing hybrid mode multicast routing. As shown in FIG. 1, operating environment 100 may comprise a plurality of switching devices 105, a plurality of sources 110, and a plurality of receivers 115. Plurality of switching devices 105 may comprise a first access switch 120, a second core switch 125, a third access switch 130, a first core switch 135, and a second core switch 140. Plurality of sources 110 may comprise a first source 145 and a second source 150. Plurality of receivers 115 may comprise a first receiver 155 and a second receiver 160. Ones of plurality of switching devices 105 may comprise, but are not limited to, switches or routers. Second core switch 125 may comprise an RP and third access switch 130 may comprise an LHR.

Ones of plurality of sources 110 and plurality of receivers 115 may comprise, but are not limited to, a smart phone, a personal computer, a tablet device, a mobile device, a camera, a telephone, a remote control device, a set-top box, a digital video recorder, an Internet-of-Things (IoT) device, a network computer, a router, an Automated Transfer Vehicle (ATV), a drone, an Unmanned Aerial Vehicle (UAV), a Virtual reality (VR)/Augmented reality (AR) device, or other similar microcomputer-based device.

The elements described above of operating environment 100 (e.g., plurality of switching devices 105, plurality of sources 110, and plurality of receivers 115) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 4, the elements of operating environment 100 may be practiced in a computing device 400.

Figure 2:
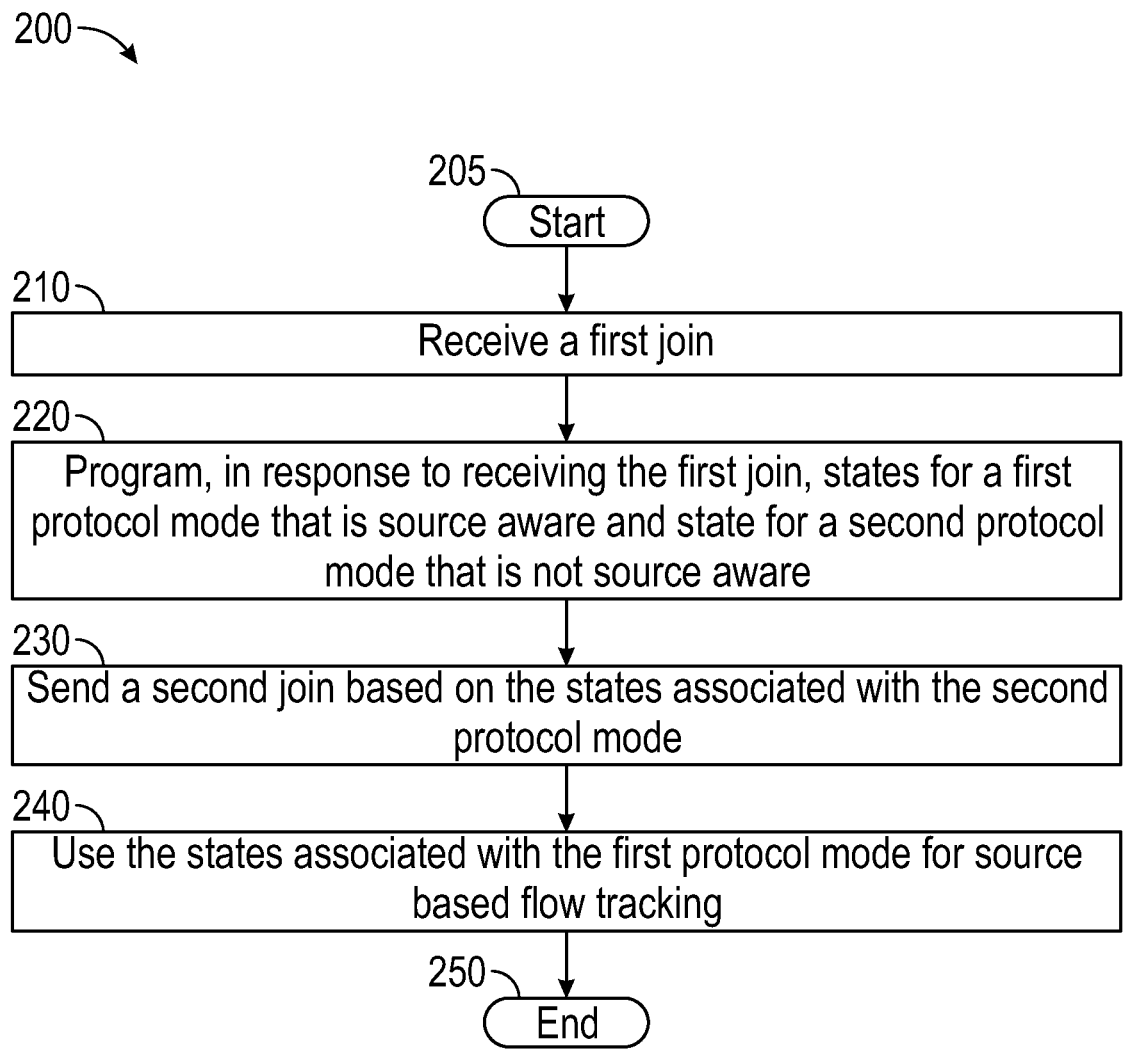
FIG. 2 is a flow chart of a method for providing hybrid mode multicast routing.

FIG. 2 is a flow chart setting forth the general stages involved in a method 200 consistent with an embodiment of the disclosure for providing hybrid mode multicast routing. Method 200 may be implemented using third access switch 130 (e.g., an LHR) as described in more detail above with respect to FIG. 1. Ways to implement the stages of method 200 will be described in greater detail below.

Method 200 may begin at starting block 205 and proceed to stage 210 where third access switch 130 may receive a first join. For example, third access switch 130, being an LHR, may receive a join from first receiver 155 (R1). First join may be directed to first source 145 (S1) located in group G (i.e., (S1, G). First receiver 155 may comprise, for example, a computer wishing to receive a video stream from first source 145 comprising a camera.

From stage 210, where third access switch 130 receives the first join, method 200 may advance to stage 220 where third access switch 130 may program, in response to receiving the first join, states for a first protocol mode (e.g., (S, G)) that may be source aware and states for a second protocol mode (e.g., (*, G)) that may not be source aware. For example, the first protocol mode (e.g., (S, G)) may comprise, but is not limited to, source aware PIM modes such as PIM-SSM, PIM-ASM, or PIM-SM. The second protocol mode (e.g., (*, G)) may comprise, but is not limited to, PIM modes that may not be source aware such as PIM-Bidir. With embodiments of the disclosure, the LHRs (e.g., third access switch 130) may maintain both (S, G) and (*, G) states. All other switches (e.g., first access switch 120, second core switch 125, first core switch 135, and second core switch 140) may have only (*, G) state programmed.

Once third access switch 130 programs, in response to receiving the first join, states for the first protocol mode (e.g., (S, G)) that may be source aware and states for the second protocol mode (e.g., (*, G)) that may not be source aware in stage 220, method 200 may continue to stage 230 where third access switch 130 may send a second join based on the states associated with the second protocol mode (e.g., (*, G)). For example, the LHR (e.g., third access switch 130) may program the (S, G) and (*, G) states as it would with the PIM-ASM mode, but it may not send (S, G) PIM joins and may use the shared tree RPF (i.e., (*, G) RPF). The second join may be sent through the topology of operating environment 100 to first source 145 for example.

After third access switch 130 sends the second join based on the states associated with the second protocol mode (e.g., (*, G)) in stage 230, method 200 may proceed to stage 240 where third access switch 130 may use the states associated with the first protocol mode (e.g., (S, G)) for source based flow tracking. For example, the source aware states (S, G) may be programmed on the LHR (e.g., third access switch 130) for the purpose of per flow tracking, but the traffic may be pulled using a PIM mode that is not source aware (e.g., (*, G) joins). All other multicast routers and First Hop Routers (FHRs) in the topology may be executing in the non-source aware mode (e.g., PIM-Bidir mode). Once third access switch 130 uses the states associated with the first protocol mode (e.g., (S, G)) for source based flow tracking in stage 240, method 200 may then end at stage 250.

Consistent with embodiments of the disclosure, better scalability may be realized on mid multicast routers and FHRs (e.g., first access switch 120, second core switch 125, first core switch 135, and second core switch 140) because a non-source aware state mode (e.g., (*, G)) may be maintained on them. Using the aforementioned example with 64 sources and 900 groups, only the LHR may have 57,600 (S, G)+900 (*, G) states, but all other routers may have only 900

(*, G). With the other example with 30,000 sources and two groups, all the routers except LHRs may have only two (*, G) entries and the LHRs may have the 60,000 entries.

Figure 3:
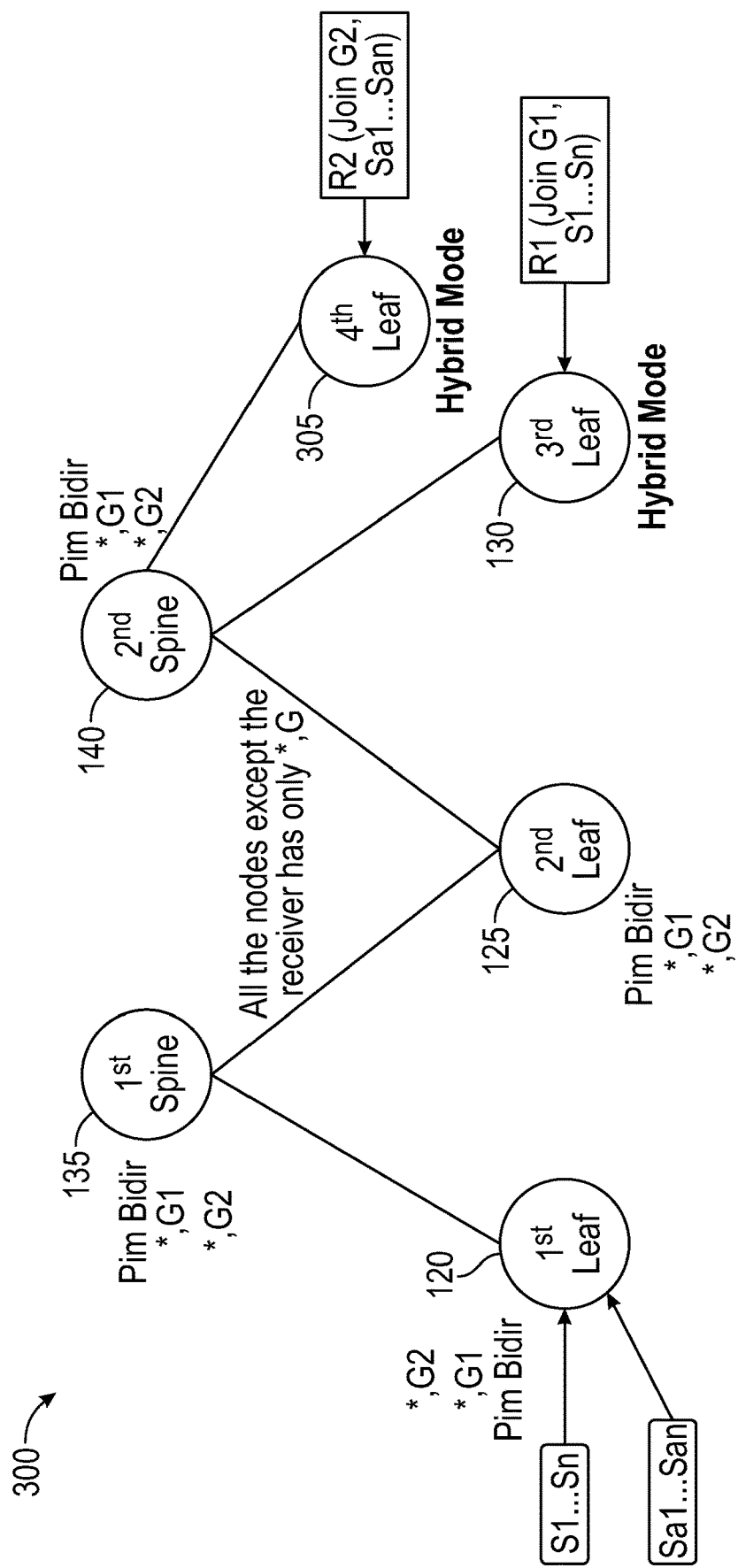
FIG. 3 illustrates an operating environment for providing hybrid mode multicast routing.

FIG. 3 shows an operating environment 300 for providing hybrid mode multicast routing. Operating environment 300 is similar to operating environment 100 with operating environment 400 including a fourth access switch 305. As illustrated by FIG. 3, because not all LHRs may be registering for the same set of sources, the burden on the topology in the upstream routers may be reduced due to lower number of states on all switches of the topology except the LHR in order to track each flow. As shown in the example of FIG. 3, without embodiments of the disclosure, first access switch 120, second core switch 125 (e.g., RP), first core switch 135, and second core switch 140 may have ((S1 . . . Sn)*G1)+ ((Sa1 . . . San)*G2) states, but with embodiments of the disclosure they may have only two (*, G) states.

Figure 4:
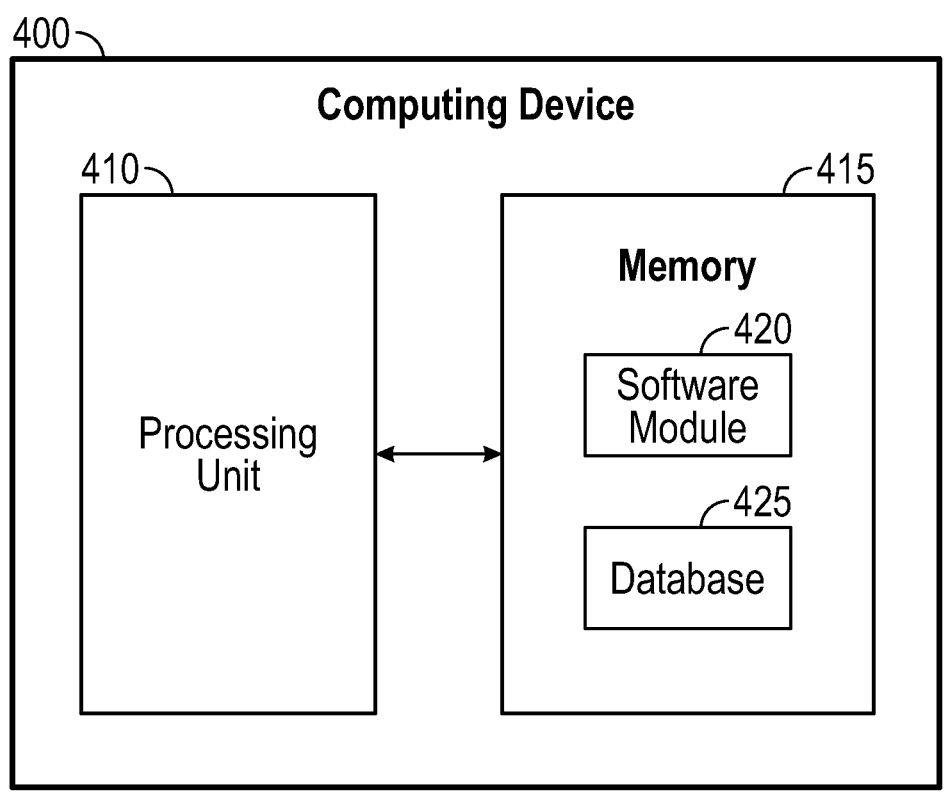
FIG. 4 is a block diagram of a computing device.

FIG. 4 shows computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for providing hybrid mode multicast routing as described above with respect to FIG. 2. Computing device 400, for example, may provide an operating environment for plurality of switching devices 105, plurality of sources 110, or plurality of receivers 115. Plurality of switching devices 105, plurality of sources 110, or plurality of receivers 115 may operate in other environments and are not limited to computing device 400.

Computing device 400 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples, and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
  receiving, by a switching device, a first join for a Protocol-Independent Multicast (PIM);
  creating, in response to receiving the first join, states for the first join for the PIM at the switching device, wherein creating the states at the switching device comprises creating the states for a first protocol mode that is source aware and the states for a second protocol mode that is not source aware;
  creating the states for the first join for the PIM at other switching devices between the switching device and a source of PIM, wherein creating the states for the first join at the other switching devices comprises creating the states only for the second protocol mode that is not source aware; and
  sending a second join based on the states associated with the second protocol mode.

2. The method of claim 1, further comprising using the states associated with the first protocol mode for source based flow tracking.

3. The method of claim 1, wherein sending the second join comprises sending the second join using shared tree Reverse-Path Forwarding (RPF) associated with the second protocol mode.

4. The method of claim 1, wherein the other switching devices in a network associated with the switching device execute in the second protocol mode.

5. The method of claim 1, wherein the switching device is a Last Hop Router (LHR).

6. The method of claim 1, wherein the second protocol mode comprises Protocol-Independent Multicast Bidirectional (PIM-Bidir) mode.

7. The method of claim 1, wherein the first protocol mode comprises Protocol-Independent Multicast Source-Specific Multicast (PIM-SM) mode.

8. The method of claim 1, wherein the first protocol mode comprises Protocol-Independent Multicast Source-Specific Multicast (PIM-SSM) mode.

9. The method of claim 1, wherein the first protocol mode comprises Protocol-Independent Any Source Multicast (PIM-ASM) mode.

10. A system comprising:
  a memory storage; and
  a processing unit disposed in a switching device and coupled to the memory storage, wherein the processing unit is operative to:
    receive a first join for a Protocol-Independent Multicast (PIM);
    create, in response to receiving the first join, states for the first join for the PIM at the switching device, wherein creating the states for the first join at the switching device comprises creating the states for a first protocol mode that is source aware and the states for a second protocol mode that is not source aware;
    creating the states for the first join for the PIM at other switching devices between the switching device and a source of PIM, wherein creating the states for the first join at the other switching devices comprises creating the states only for the second protocol mode that is not source aware; and
    send a second join based on the states associated with the second protocol mode.

11. The system of claim 10, wherein the processing unit is further operative to use the states associated with the first protocol mode for source based flow tracking.

12. The system of claim 10, wherein the processing unit be operative to send the second join comprises the processing unit be operative to send the second join using shared tree Reverse-Path Forwarding (RPF) associated with the second protocol mode.

13. The system of claim 10, wherein the switching device is a Last Hop Router (LHR).

14. The system of claim 10, wherein the second protocol mode comprises Protocol-Independent Multicast Bidirectional (PIM-Bidir) mode.

15. The system of claim 10, wherein the first protocol mode comprises one of the following: Protocol-Independent Multicast Source-Specific Multicast (PIM-SM) mode; PIM Source-Specific Multicast (PIM-SSM) mode; and PIM Any Source Multicast (PIM-ASM) mode.

16. A non-transitory computer-readable medium that stores a set of instructions which when executed perform a method executed by the set of instructions comprising:
  receiving, by a switching device, a first join for a Protocol-Independent Multicast (PIM);
  creating, in response to receiving the first join, states for the first join for the PIM at the switching device, wherein creating the states at the switching device comprises creating the states for a first protocol mode that is source aware and the states for a second protocol mode that is not source aware;
  creating the states for the first join for the PIM at other switching devices between the switching device and a source of PIM, wherein creating the states for the first join at the other switching devices comprises creating the states only for the second protocol mode that is not source aware; and
  sending a second join based on the states associated with the second protocol mode.

17. The non-transitory computer-readable medium of claim 16, further comprising using the states associated with the first protocol mode for source based flow tracking.

18. The non-transitory computer-readable medium of claim 16, wherein sending the second join comprises sending the second join using shared tree Reverse-Path Forwarding (RPF) associated with the second protocol mode.

19. The non-transitory computer-readable medium of claim 16, wherein the switching device is a Last Hop Router (LHR).

20. The non-transitory computer-readable medium of claim 16, wherein the second protocol mode comprises Protocol-Independent Multicast Bidirectional (PIM Bidir) mode.

* * * * *